(12) United States Patent
Bateham

(10) Patent No.: US 10,371,119 B2
(45) Date of Patent: Aug. 6, 2019

(54) HYDROELECTRIC POWER SYSTEM AND PUMP

(71) Applicant: YOURBROOK ENERGY SYSTEMS LTD., Queen Charlotte (CA)

(72) Inventor: Laird Galen Bateham, Queen Charlotte (CA)

(73) Assignee: Yourbrook Energy Systems Ltd., Queen Charlotte (CA)

(*) Notice: Subject to any disclaimer, the term of this patent is extended or adjusted under 35 U.S.C. 154(b) by 40 days.

(21) Appl. No.: 15/832,274

(22) Filed: Dec. 5, 2017

(65) Prior Publication Data

US 2018/0100482 A1 Apr. 12, 2018

Related U.S. Application Data

(63) Continuation of application No. 14/375,410, filed as application No. PCT/CA2013/050039 on Jan. 22, 2013, now Pat. No. 9,951,748.

(Continued)

(51) Int. Cl.
*F04B 1/14* (2006.01)
*F04B 1/16* (2006.01)
(Continued)

(52) U.S. Cl.
CPC .............. *F03B 13/26* (2013.01); *F03B 13/06* (2013.01); *F03B 13/264* (2013.01); *F04B 1/145* (2013.01);
(Continued)

(58) Field of Classification Search
CPC ........ F04B 1/2078; F04B 1/148; F04B 1/146; F04B 17/00; Y02E 10/20; Y02E 10/223;
(Continued)

(56) References Cited

U.S. PATENT DOCUMENTS 3,143,973 A 8/1964 Budzich
3,376,822 A 4/1968 Leduc et al.
(Continued)

FOREIGN PATENT DOCUMENTS

EP 0 201 147 A1 11/1986
EP 0 752 530 A1 1/1997
(Continued)

OTHER PUBLICATIONS

International Search Report, dated Mar. 20, 2013, for PCT/CA2013/050039, 3 pages.
(Continued)

*Primary Examiner* — Mark A Laurenzi
*Assistant Examiner* — Mickey H France
(74) *Attorney, Agent, or Firm* — Cozen O'Connor

(57) ABSTRACT

A hydroelectric power system and pump suitable for the system are disclosed which can make efficient use of the energy available in water flows with considerably variable flow rates. A simple, compact variable displacement axial piston pump can be operated so as to provide an essentially constant output pumping pressure and variable output volume that varies efficiently in accordance with water flow rate. The system is particularly suitable for shoreline tidal power generation and provides firm power output throughout the tidal slacks occurring during the tidal reversals.

9 Claims, 6 Drawing Sheets

Related U.S. Application Data

(60) Provisional application No. 61/593,824, filed on Feb. 1, 2012.

(51) Int. Cl.
  *F04B 1/20* (2006.01)
  *F04B 1/29* (2006.01)
  *F03B 13/06* (2006.01)
  *F03B 13/26* (2006.01)
  *F04B 17/00* (2006.01)

(52) U.S. Cl.
  CPC .............. *F04B 1/146* (2013.01); *F04B 1/148* (2013.01); *F04B 1/16* (2013.01); *F04B 1/2078* (2013.01); *F04B 1/295* (2013.01); *F04B 17/00* (2013.01); *Y02E 10/28* (2013.01); *Y02E 60/17* (2013.01)

(58) Field of Classification Search
  CPC ....... Y02E 10/226; Y02E 10/28; Y02E 10/38; F03B 13/00; F03B 13/06; F03B 13/12; F03B 13/14; F03B 13/16; F03B 13/18; F03B 13/1825; F03B 13/183; F03B 13/1835; F03B 13/184; F03B 13/22; F03B 13/26; F03B 13/264; F03B 15/02; F03B 15/04; F03B 15/06; F03B 15/08; F03B 15/10; F03B 15/12; F03B 15/16; F03B 15/18; F03B 17/005; F03B 17/062; F03B 17/02; F03B 1/00; F03B 1/02; F03B 3/14; F03B 7/00–7/006; F03B 11/02
  USPC .................. 60/495–507; 290/42, 53, 54, 43; 417/100, 330–334, 336
  See application file for complete search history.

(56) References Cited

U.S. PATENT DOCUMENTS

| | | | |
|---|---|---|---|
| 3,797,245 A | 3/1974 | Hein | |
| 4,137,013 A | 1/1979 | Woodruff | |
| 6,023,105 A | 2/2000 | Youssef | |
| 6,139,750 A * | 10/2000 | Graham | B01D 61/06 210/652 |
| 6,145,308 A * | 11/2000 | Bueche | F04B 49/002 60/398 |
| 6,454,546 B1 | 9/2002 | Huang | |
| 2007/0258771 A1 | 11/2007 | Weldon | |
| 2008/0279687 A1 | 11/2008 | Hofmann | |
| 2012/0019004 A1 | 1/2012 | Ekern | |

FOREIGN PATENT DOCUMENTS

| | | |
|---|---|---|
| GB | 391789 | 9/1931 |
| JP | 2003-049763 | 2/2003 |
| WO | 00/14401 A1 | 3/2000 |

OTHER PUBLICATIONS

Hart, S., "Haida Gwaii / Queen Charlotte Islands Demonstration Tidal Power Plant Feasibility Study," a Hatch Energy Report for British Columbia15 Ministry of Energy, Mines and Petroleum Resources, Mar. 2008, 103 pages.

Müller et al., "Stream Wheels for Applications in Shallow and Deep Water," $32^{nd}$ IAHR Conference, Venice, Italy, Jul. 1-6, 2007, 9 pages.

Bateham, L.G., "Hydroelectric Power System and Pump," Office Action dated Apr. 5, 2017, for U.S. Appl. No. 14/375,410, 11 pages.

Bateham, L.G., "Hydroelectric Power System and Pump," Amendment filed Jun. 28, 2017, for U.S. Appl. No. 14/375,410, 15 pages.

Bateham, L.G., "Hydroelectric Power System and Pump," Office Action dated Oct. 4, 2017, for U.S. Appl. No. 14/375,410, 10 pages.

Bateham, L.G., "Hydroelectric Power System and Pump," Amendment filed Nov. 21, 2017, for U.S. Appl. No. 14/375,410, 10 pages.

Extended European Search Report, dated Dec. 12, 2017, for European Application No. 17001207.4-1616, 7 pages.

* cited by examiner

HYDROELECTRIC POWER SYSTEM AND PUMP

TECHNICAL FIELD

The present disclosure relates to methods and systems for hydroelectric power generation. In particular, it relates to systems for tidal power generation, operation thereof, and to variable displacement, axial piston pumps suitable for such systems.

BACKGROUND

Description of the Related Art

Many coastal locations in the world have the potential for tidal power generation but lack the ability to provide firm power. Present tidal power production designs and systems typically lack the infrastructure or adequate efficiency to store and release a practical amount of energy during slack tide. For instance, Graham Island of Haida Gwaii is presently without an adequate firm source of "green" energy to replace the diesel generators now in use there. Graham Island has the potential for both wind and tidal power according to S. Hart, 2008, "Haida Gwaii/Queen Charlotte Islands Demonstration Tidal Power Plant Feasibility Study. A Hatch Energy report for British Columbia Ministry of Energy, Mines and Petroleum Resources." However, both sources provide intermittent energy production in the absence of storage.

Various systems have been proposed in the art that use water movement as a source of energy and fluid pumped to an elevated reservoir to store the energy prior to using the fluid to drive a turbine for generating electricity. For instance, published US application US2007/258771 discloses a simple way using a class #2 simple lever machine principal to harvest and transport energy from the bottom of an ocean or lake from the action of water waves beyond the shore and up on land. The fulcrum for this lever is an anchor on the seafloor, at the opposite end of this lever, the force, or energy, is an attached water container that rises and falls with water wave action. A water pump anchored to the seafloor and reaching the underside of the water container receives the energy and pumps water continually and harmoniously with the vertical movements of this water container to shore and into a fresh water reservoir. After the water has lost its energy to do work from its loss of elevation below the reservoir it can be recycled back to the water pump. This application will show the water from the reservoir to be used in the generation of electricity and either recycled back to the water pump, or wasted after use, and a continual supply of fresh water from another source is available for use.

However, the pumps suggested for use in hydroelectric power systems like the preceding are typically limited in their ability to efficiently adjust for the variable, intermittent energy available from tides and/or waves. Pumps considered in the prior art may be unable to both provide sufficient output pressure to pump fluid to the reservoir at times of weak energy supply (e.g. slack tide), while also taking full advantage of the available energy at times of strong energy supply (e.g. peak tide flow rate).

Axial piston pumps using designs and configurations based on rotating piston clusters and fixed (non-rotating) swash plates have been used for decades in diverse high rpm industrial applications (e.g. transmissions). Generally, such pumps are fixed displacement types in which the angle of the swash plates with respect to the rotating piston clusters is fixed. However, axial piston pumps with variable displacement are also known in the art in which the angle of the swash plates in the aforementioned designs can be adjusted with respect to the rotating piston clusters during use. Further still, fixed displacement axial piston pumps with fixed piston clusters and swash plates that rotate at a fixed angle to the shaft are also known in the art.

There remains a continuing need for more efficient hydroelectric power systems and pumps therefor to store and release energy from water sources flowing at considerably varied speeds. The present disclosure addresses this need while additionally providing other benefits as disclosed herein.

BRIEF SUMMARY

A hydroelectric power system is disclosed in which a waterwheel drives a variable displacement piston pump via swash plates. The swash plate is angled to meet minimum water head requirements at low rates of water flow and maximize pumped pumpwater flow at higher water flow rates. Using such pumps in this manner is thus essentially the reverse of their typical function in other conventional applications. Instead of being provided with constant input power and then delivering a variable output, here the pump is provided with variable input power and is operated to deliver an essentially constant output pressure over as much of a range as is practical to obtain. The pumping system can be combined with a hydro plant and water storage system to provide firm power to the local grid. Use of such variable displacement piston pumps is an effective, cost-efficient way to harness intermittent tidal energy and balance it into continuous firm power.

A preferred pump for this application is a variable displacement axial piston pump designed for use at low RPM and comprises a central inboard rotating swash plate pivot assembly with fixed outboard piston cylinder clusters and associated hardware. The pump may desirably be designed to operate with greater maximum swash plate angles than is typical in conventional axial piston pumps. Further, the pump can be optionally designed to pump in either rotation direction to accommodate a reversal in direction of the driving water flow.

Generally, a hydropower pump intended for such applications comprises a variable displacement piston pump comprising a rotating shaft, a piston cylinder cluster, a manifold and valve assembly, a piston assembly, a swash plate pivot assembly, and a control assembly for adjusting the angle of the swash plates in the swash plate pivot assembly. The hydropower pump further comprises a waterwheel blade connected to the outer casing and rotating shaft. In one suitable embodiment, the variable displacement piston pump in the hydropower pump is the aforementioned variable displacement axial piston pump.

A hydroelectric power system for generating tidal power can thus comprise the aforementioned hydropower pump and a pier comprising the hydropower pump which is anchored to a seabed location to orient the waterwheel blade with respect to the tide. The system further comprises an upper reservoir for accumulating pumpwater pumped by the hydropower pump, a hydro turbine for generating electrical power, a lower reservoir for accumulating pumpwater passing through the hydro turbine, a penstock for piping pumpwater from the hydropower pump to the upper reservoir and for piping pumpwater from hydropower pump and from the upper reservoir through the hydro turbine and to the lower reservoir, and a piping network for returning pumpwater from the lower reservoir to an inlet of the hydropower pump and for providing pumpwater from an outlet of the hydropower pump to the penstock, and a controller for controlling the control assembly in the hydropower pump.

The disclosure is suitable for generating hydroelectric power from sources of flowing water in which the water speed varies over a considerable range. In general, this is accomplished by providing the aforementioned hydropower pump, providing a supply of pumpwater, positioning the waterwheel blade in the flowing water such that the pump shaft rotates with the flow of water and pumps pumpwater from the supply, and controlling the angle of the swash plates in the pump such that the angle is decreased and increased in accordance with a respective decrease and increase in water speed while maintaining an essentially constant output pressure of pumpwater from the pump over most of the water speed range (output pressure can be maintained essentially constant except for water speeds near zero). A portion of the pumped pumpwater is stored in an upper reservoir positioned above the hydropower pump.

There are several design options for variable displacement piston pumps which may be considered for this application. However, an axial piston pump design with outboard or external swash plates and with the intake and discharge at the centre of the pump body would require means for getting intake and discharge flow lines through rotating mechanisms. A pump design with outboard swash plate and inboard piston cylinder clusters could be considered in which the waterwheel was mounted externally on either end of the pump shaft, but this could undesirably result in an extremely wide machine. And pumps with rotating piston cylinder clusters and fixed swash plates may be contemplated but typically these have been designed to operate in oil to lubricate the components and would thus be difficult to adapt for pumping water. Variations of shaft-driven variable stroke axial piston pumps or variable stroke radial piston pumps could be adapted for use and mounted separately on either end of the drive rotors' axle shaft, but may not be nearly as simple or compact.

A variable displacement axial piston pump that is particularly suitable for this application comprises a housing frame comprising a rotating outer core, and a rotating shaft within the housing frame and connected to the outer core in which the shaft defines an axis of rotation for the pump. The pump further comprises a fixed outboard piston cylinder cluster at an end of the shaft (and preferably each end of the shaft) within the housing frame in which each cylinder cluster comprises at least one piston cylinder. The pump also comprises a fixed manifold and valve assembly connected to the outboard head of each fixed outboard piston cylinder cluster. The manifold and valve assembly may be adjacent to the outboard head or alternatively may be connected thereto from a remote location. Also, the pump comprises a piston assembly at the end or ends of the shaft at the inboard opening of each piston cylinder cluster and each piston assembly comprises at least one piston, a piston rod connected to the piston, and a piston rod mounting assembly in which each piston assembly is mounted such that each piston is capable of reciprocating axial movement within its adjacent piston cylinder and the piston rod mounting assembly is capable of pivoting with respect to the shaft. The pump also comprises a rotating swash plate pivot assembly comprising a pivoting swash plate subassembly at each end of the shaft inboard of each piston assembly and connected to the shaft so as to rotate with the shaft and be capable of pivoting with respect to the shaft, and a swash plate adjustment subassembly connected to each pivoting swash plate subassembly and mounted to cause each swash plate subassembly to pivot according to adjustment of the swash plate adjustment subassembly (e.g. length change of the swash plate adjustment subassembly). Finally, the pump comprises a control system for controlling the length of the swash plate adjustment subassembly and hence the angle of the swash plates.

DETAILED DESCRIPTION

Certain terminology is used in the present description and is intended to be interpreted according to the definitions provided below. In addition, terms such as "a" and "comprises" are to be taken as open-ended. Further, all US patent publications and other patent and non-patent references cited herein are intended to be incorporated by reference in their entirety.

Herein, the term "about" in quantitative contexts is to be construed as meaning plus or minus 10%.

The hydroelectric power system of the disclosure is particularly suited to harness shoreline tidal or other hydro energy available in water flows characterized by considerably variable flow rates. The system comprises a variable displacement piston pump which is operated so as to provide an essentially constant output pumping pressure and variable output volume over most of the range of available water flow rates. (Essentially constant output pumping pressure can be maintained except at water speeds near zero.) Desirably, the system provides firm power output throughout the tidal slacks occurring during the tidal reversals.

Figure 1:
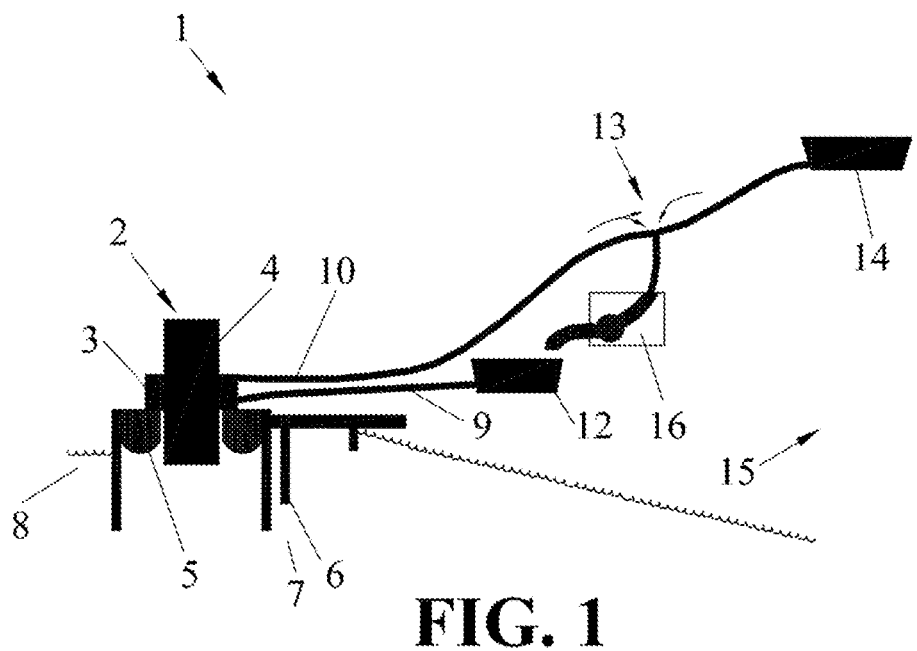
FIG. 1 shows an exemplary hydroelectric power system of the disclosure.

An exemplary hydroelectric power system is shown in the schematic of FIG. 1. Hydroelectric power system 1 comprises hydropower pump 2 which itself comprises variable displacement axial piston pump 3 and waterwheel blade 4 attached to the rotating shaft (not shown in this figure) of axial piston pump 3.

In the embodiment of FIG. 1, hydropower pump 2 is mounted on floating barge 5. In turn, the subassembly comprising hydropower pump 2 and barge 5 is mounted on pier 6 which is anchored to a seabed location 7 suitable for power generation. Further, the subassembly is mounted on pier 6 such that it is capable of vertical motion and can thus rise and fall with the tide. In this way, the depth of waterwheel blade 4 in the sea 8 can be kept essentially constant. Pier 6 is anchored in such a manner so as to orient waterwheel blade 4 optimally with respect to the motion of the tide.

As water flows under hydropower pump 2 with the rise and fall of the tide, waterwheel blade 4 drives axial piston pump 3 which in turn pumps pumpwater received at axial piston pump inlet 9 from lower reservoir 12 (sump) out from axial piston pump outlet 10 to penstock 13.

Figure 2:
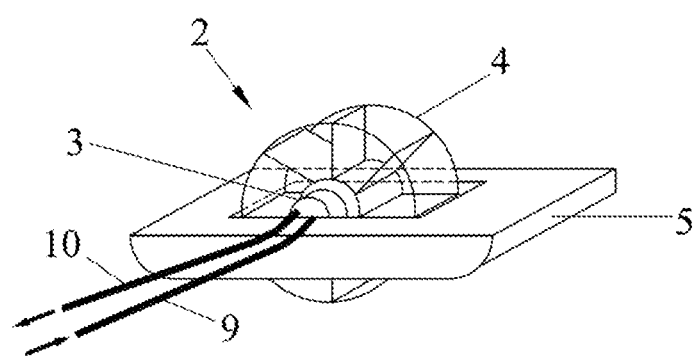
FIG. 2 shows a view of the subassembly comprising the hydropower pump and floating barge.

FIG. 2 shows a more detailed view of the subassembly comprising hydropower pump 2 and floating barge 5.

Hydroelectric power system 1 additionally comprises upper reservoir 14 for accumulating pumpwater pumped by hydropower pump 2. Upper reservoir 14 is positioned at a suitable elevated location somewhere on land 15. Hydro turbine 16 is used to generate electrical power from pumpwater provided from penstock 13.

Penstock 13 pipes pumpwater from hydropower pump 2 to upper reservoir 14 for storage during periods of relatively high tidal flow or generally during periods where the supply of pumped pumpwater exceeds demand from hydro turbine 16. Penstock 13 also pipes pumpwater directly from hydropower pump 2 and/or from upper reservoir 14 to hydro turbine 16 in accordance with electrical demand and in accordance with the supply of pumpwater available from hydropower pump 2 at any given time.

After passing through hydro turbine 16, pumpwater is returned to lower reservoir 12 and is thus available again as a supply of pumpwater for hydropower pump 2. Hydroelectric power system 1 comprises a piping network (not called out in FIG. 1) for returning this pumpwater to inlet 9 of axial piston pump 3 and for providing pumpwater from outlet 10 to penstock 13.

System 1 thus employs a relatively closed circuit subsystem for handling pumpwater and thus the supply of pumpwater may only need to be refreshed from time to time. Preferably a supply of fresh water is employed for pumpwater as this reduces problems associated with corrosion, marine growth, or the like.

As shown in FIG. 1, hydropower pump 2 is mounted permanently on pier 6 with access to the nearby shore. Waterwheel 4 can rotate in either direction with the incoming and outgoing tidal flow. Waterwheel 4 should be relatively unaffected by floating driftwood, ice, and minimally affected by marine growth. Mounting hydropower pump 2 above the waterline and with its axis horizontal allows all sensitive components, bearings and equipment to be located out of the seawater, allowing ease of maintenance and long service life. Optionally, the mounting system for hydropower pump 2 can be built such that waterwheel 4 can be raised out of the water completely for maintenance and safety reasons. Alternatively, the waterwheel may be equipped with retractable blades.

Energy from tidal flow is transferred to axial piston pump 3 via rotation of waterwheel 4. Axial piston pump 3 is designed to operate and pump in either rotation direction and does not need to operate at a constant rpm. Further, axial piston pump 3 can operate at speeds as low as one revolution per minute and thus extract the maximum amount of energy from waterwheel area in flow without the necessity for a speed increase gearbox.

Axial piston pump 3 is operated so as to maintain a constant output pressure regardless of the input torque from the waterwheel by adjusting the stroke and output volume relative to tidal flow speeds throughout most of the entire tide cycle. During periods of high tidal flows, the pump stroke can be reduced thereby allowing the waterwheel to freewheel in order to maintain the volumes required to be pumped or alternatively to shut down the system. During times of high flow velocity in a given tide cycle, the volume of water pumped will typically exceed the volume demanded from hydro turbine 16. This excess volume will accumulate in upper reservoir 14 and flow back down penstock 13 to hydro turbine 16 during periods of slack tide.

A controller (not called out in FIG. 1) is used to control the operation of variable displacement, axial piston pump 3 in this manner. Constant output pressure is achieved by varying the pump displacement in accordance with the tidal flow. And the pump displacement is varied by adjusting the angle of pivoting swash plates therein. As is known to those in the art, a wide variety of simple electronic or mechanical systems may be considered for use as a suitable controller. Inputs for the controller may include measured factors such as waterwheel speed, swash plate angle, output pressure and so on.

Other design details and operation considerations may generally be specific to a given site where the power is to be generated and to the amount of electricity demanded. For sites with very limited reservoir capacity, the system's firm power output will be the 24 hour average of the volumes pumped throughout the daily tide cycles and based on the days of the least tidal movement. For sites with larger reservoir potential the firm capacity will be the average of the annual volumes pumped.

Calculated examples are provided below which illustrate additional details of construction and operation for two possible designs and sizes of power plants modeled using tidal flows and characteristics at Juskatla Narrows in British Columbia, Canada. It is expected that those skilled in the art will readily be able to adapt the system design and operation to other sites and electrical power needs. Of course, the typical stream flow velocities, volumes, and other tide conditions at the desired identified site need to be determined and considered. And designs, sizing, and location for a waterwheel, variable displacement axial piston pump, reservoirs, hydro turbine, etc. that are appropriate for the site conditions must then be determined.

Particular considerations include the design of the mounting arrangement for the hydropower pump. For instance, as have been used for waterwheels on floating mills historically, the hull design of barge 5 can be used to concentrate and accelerate tidal water flow between catamaran style hulls where waterwheel 4 engages the stream. Another significant consideration is the design of waterwheel 4. As is known in the art, the paddle design employed in a given situation may have a significant effect on operating efficiency.

The variable displacement, piston pump employed in the hydroelectric system is also an important consideration and design details can have a significant impact on performance. An axial pump suitable for such applications is illustrated in FIGS. 3*a* to 3*f*. The pump is of relatively simple construction, is relatively compact, operates at low rpm, and allows for relatively large adjustment of swash plate angle and hence can provide constant output pressures over wide range of water stream velocities. Because the present pump operates at much lower rpm compared to conventional axial piston pumps, friction losses may be substantially reduced. This allows for the maximum swash plate angle to be increased over the approximate 18 degrees industry standard common in high pressure, high speed swash plate pumps.

The present pump is therefore able to function more efficiently and effectively over a wider range of stream speeds. It is expected that such pumps may achieve angles as high as 25 to 30 degrees.

Figure 3A:
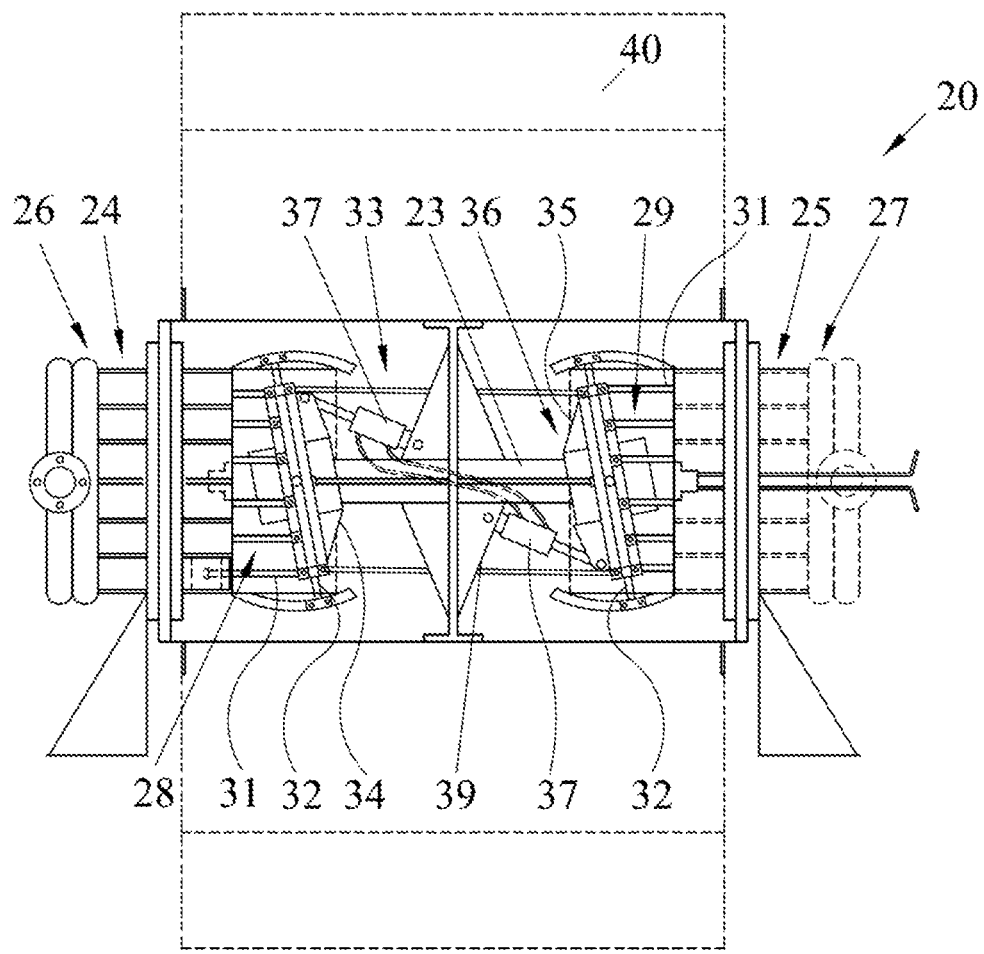
FIG. 3a shows a sketch of the internal workings of a variable displacement, axial piston pump for hydroelectric power generation.

FIG. 3a shows a sketch of the internal workings of one suitable embodiment of a variable displacement, axial piston pump for hydroelectric power generation. Pump 20 comprises main shaft 23 defining the axis of rotation for the pump. Within the pump housing are two fixed outboard piston cylinder clusters at each end of shaft 23. Each piston cylinder cluster comprises at least one piston cylinder and generally multiple piston cylinders. In the embodiment depicted here, each cluster comprises nine piston cylinders. Connected to the outboard head of each piston cylinder cluster 24 and 25 are fixed manifold and valve assemblies 26 and 27 respectively. A pair of piston assemblies 28 and 29 are located at each end of shaft 23 at the inboard opening of each piston cylinder cluster 24 and 25 respectively. Each piston assembly comprises a set of pistons, piston rods connected to the pistons, and a mounting assembly for the piston rods. In FIG. 3a, the pistons are not visible. However, portions of piston rods 31 and each piston rod mounting assembly 32 are visible. Piston assemblies 28, 29 are mounted such that the pistons are capable of reciprocating axial movement within its associated piston cylinder. Further, each piston rod mounting assembly 32 is capable of pivoting with respect to shaft 23.

Pump 20 also comprises rotating swash plate pivot assembly 33 which includes a pair of pivoting swash plate subassemblies 34 and 35 at each end of shaft 23 inboard of each piston assembly 28, 29. Pivoting swash plate subassemblies 34 and 35 are connected to shaft 23 (and thus rotate therewith) and are additionally capable of pivoting with respect to the axis of shaft 23. Rotating swash plate pivot assembly 33 also comprises swash plate adjustment subassembly 36 which is connected to each pivoting swash plate subassembly 34, 35 and mounted so as to cause each swash plate subassembly 34, 35 to pivot according to the length of swash plate adjustment subassembly 36.

In the embodiment shown in FIG. 3a, swash plate adjustment subassembly 36 comprises hydraulic ram cylinders 37 which connect to both pivoting swash plate subassemblies 34 and 35 to connecting flanges 39. The length of swash plate adjustment subassembly 36 is varied by hydraulically varying the extension of hydraulic ram cylinders 37. In this embodiment, hydraulic ram cylinders 37 are double acting and thus can be extended or contracted via hydraulic control. A control system (also not shown) is employed to control the extension of the hydraulic ram cylinders and hence the length of swash plate adjustment subassembly 36.

An outline of the location of waterwheel 40 is also shown in FIG. 3a in order to indicate its relative location with respect to pump 20. Waterwheel 40 is directly coupled to shaft 23. Thus, as waterwheel 40 rotates about shaft 23, rotating swash plate pivot assembly 33 is also forced to rotate and does so freely and independently of piston assemblies 28, 29. Piston assemblies 28, 29 do not rotate but reciprocating pumping motion for pistons 30 occurs as a result of the rotation of rotating swash plate pivot assembly 33.

Figure 3B:
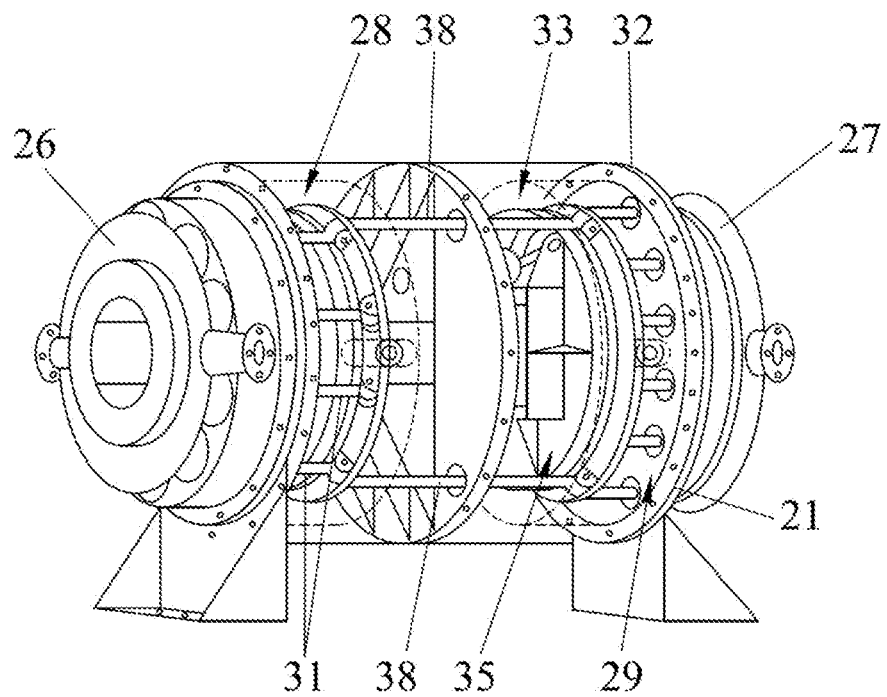
FIG. 3b shows an external view of the pump absent rotating outer core and attached waterwheel.

The swash plate inclination or angle of pivoting swash plate subassemblies 34 and 35 is adjusted using a simple hydraulic control system such that the primary control input is the pump output pressure. At low stream speeds, there is relatively less power available for pumping, and so the swash plate angle is set at a shallow inclination, thus shortening piston stroke, maximizing mechanical advantage, and maintaining both the required output pressure and some flow to the upper reservoir even at low speed. As stream speed increases, output force (torque) increases, and the swash plate angle can be increased, thus increasing piston stroke and hence flow of pumpwater. Once the swash plate angle reaches the maximum allowable, the rotational speed of waterwheel 40 is allowed to increase relative to stream flow, thus increasing the pumpwater flow as well. At faster stream flows, once the swash plate angle has reached maximum, waterwheel 40 is allowed to spin faster but will no longer operate at its maximum potential power output and efficiency. (It is thus desirable to be able to achieve greater swash plate angles and thereby obtain the greatest possible efficiency over a wider range of stream flows.) Further details of the construction of variable displacement, axial piston pump 20 are shown in FIGS. 3b to 3f FIG. 3b shows an external view of pump 20 absent rotating outer core 22 and attached waterwheel 40. In addition to features already disclosed in FIG. 3a, FIG. 3b shows housing frame 21 for pump 20 and tie rods 38. Tie rods 38 tie both stationary outboard flanges of the swash plates together to balance their angle of adjustment. The diameter of swash plates and carrier bearings employed as well as the number and displacement of the piston cylinders are directly related to the size of pump 20. The width and diameter of the waterwheel employed will dictate the dimensions of the pump's inner mechanisms. Swash plate diameter and cylinder displacement are sized according to the required output pressure from the pump. Both of these relate to the input power arising from the stream velocities and the specific requirements of the installation site. Once swash plate diameter and the width of outer core 22 have been established, the remainder of the component dimensions can be determined.

Figure 3C:
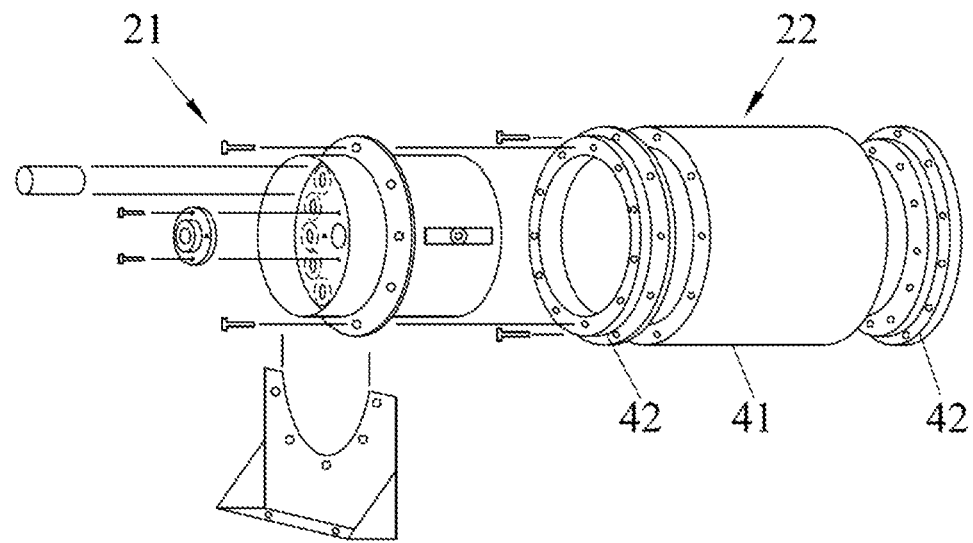
FIG. 3c shows an exploded view of a portion of the pump.

FIG. 3c shows an exploded view of a portion of pump 20. Pictured therein is rotating outer core 22 which is centrally located about pump 20 and coupled to shaft 23. Outer core 22 serves as an inner core for an attached waterwheel (not shown) as well as the protective outer cover for the internal mechanisms of the pump. It may be constructed in three separate sections: a solid core 41 (e.g. a rolled metal cylinder) and two flanged end assemblies 42 which are bolted to the outer races of carrier, slewing bearings. (Slewing bearings are typically ball or cylindrical roller bearings that can accommodate axial, radial, and moment loads. They are not mounted on a shaft or in a housing and are instead bolted to a seating surface.) The two flanged end assemblies will allow for bearing alignment. Outer core 22 is also fitted with, for instance, flanges for attaching a waterwheel. Also shown in FIG. 3c are exploded components which may be used in the design of housing frame 21. These include a base, bearing mounts, additional bearings for shaft 23 and track runner bearings, and so on. The track runner bearings act as torque stabilizers for the non-rotating, slewing outboard portion of the swash plates that are connected to the piston rods. Such constructions are well known in the art and the components are not called out in FIG. 3c. The outward forces generated in piston compression will be contained within the pump body.

Figure 3D:
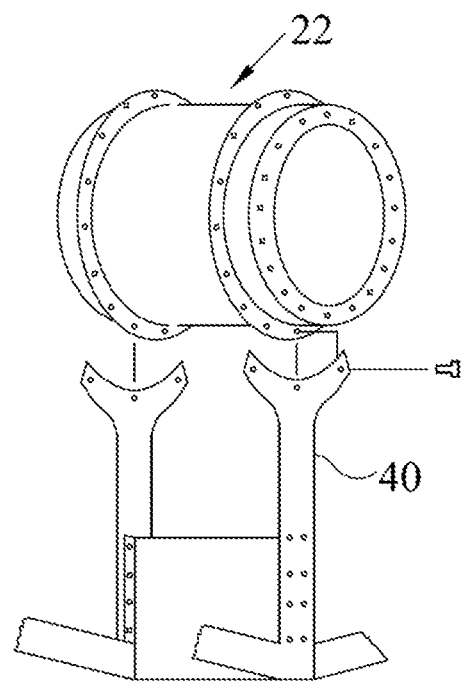
FIG. 3d shows an exploded view of the outer core and an optional embodiment for the waterwheel used for the pump.

FIG. 3d shows an exploded view of outer core 22 and an optional embodiment for waterwheel 40. As shown, optional waterwheel 40 comprises a series of spokes and blades. In operation, the blades would be mounted so as to be immersed in the flowing water at right angles to the direction of flow.

Figure 3E:
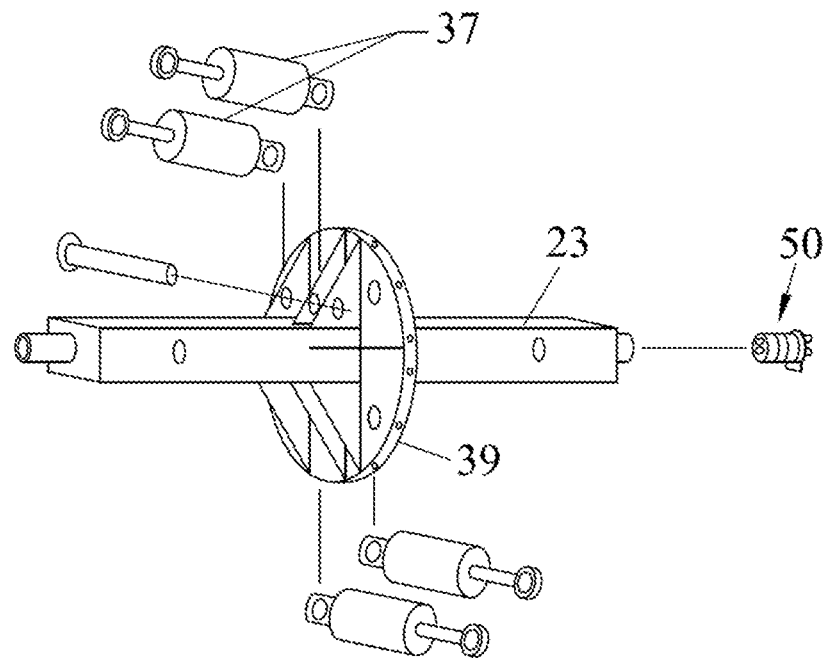
FIG. 3e shows an exploded view of a portion of the rotating swash plate pivot assembly in the pump (viewed from the inboard side of the connecting flange).

FIG. 3e shows an exploded view of a portion of rotating swash plate pivot assembly 33 from the inboard side of connecting flange 39. Here hydraulic ram cylinders 37 would be attached via a pin to connecting flange 39. The rod ends of hydraulic ram cylinders 37 connect to a corresponding pivoting swash plate subassembly. FIG. 3e also shows a hydraulic rotary manifold 50 which allows hydraulic fluid to access hydraulic ram cylinders 37 for purposes of controlling swash plate angle.

Figure 3F:
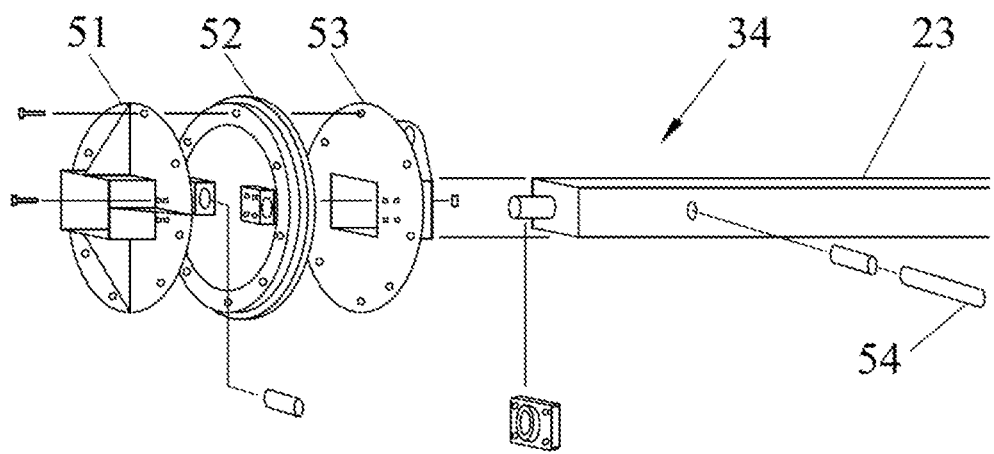
FIG. 3f shows an exploded view of a portion of rotating swash plate pivot assembly in the pump (viewed from the outboard side of the pivoting swash plate subassembly).

FIG. 3f shows an exploded view of a portion of rotating swash plate pivot assembly 33 from the outboard side of pivoting swash plate subassembly 34. Pivoting swash plate subassembly 34 may comprise outer and inner bearing carriers 51 and 53 respectively which are used to contain ring-shaped slewing bearing 52. Subassembly 34 is mounted to shaft 23 via pin 54 which allows subassembly 34 to pivot with respect to the axis of shaft 23. Not shown in FIG. 3f are the hydraulic cylinders attached to adjust the pivot or swash plate angle of subassembly 34.

Shaft 23 may be constructed of steel box tubing fitted internally with steel pipe and stitch welded together to prevent distortion under load. Shaft 23 can extend the width of the pump, carried by bearings mounted in the centre of housing frame 21 on either end. The bearing spindles may be hollow tubing in order to allow access for hydraulic lines and mounting of rotary manifold 50. A centre flange may be provided which bolts the shaft to rotating outer core 22 and thus provides rotational force from outer core 22 to shaft 23.

Hydraulic ram cylinders 37 may be sized to operate at approximately 50 percent of their continuous operating pressure when the pump is under full load conditions.

Piston cylinder clusters 24, 25, manifold valve assemblies 26, 27 and piston assemblies 28, 29 may be designed and made in various manners familiar to those skilled in the art. For instance, gusseted flanges may be used to connect the piston connecting rods to the swash plate 32. Track runners may be employed to accommodate the maximum swash plate angle and act as torque stabilizers for the stationary outboard side of the piston assemblies. In order to maintain alignment of the pistons in their associated cylinder barrels, piston skirts are employed.

Figure 4:
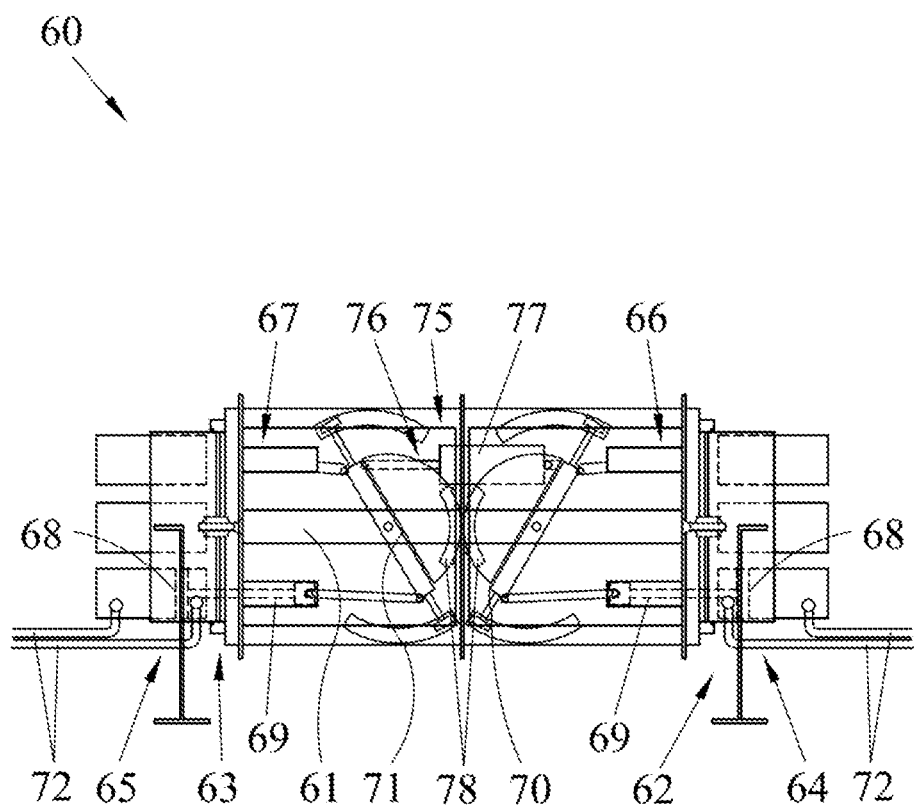
FIG. 4 shows a sketch of the internal workings of an alternative embodiment of a variable displacement, axial piston pump comprising double-acting pistons for hydroelectric power generation.

An alternative embodiment for a variable displacement, axial pump suitable for this application is illustrated in FIG. 4. The main differences between this embodiment and that shown in FIGS. 3a-3f are the use of double-acting pistons in the piston cylinder clusters and the relative configuration of the swash plate subassemblies. The use of double-acting pistons allows for the pistons to pumpwater when travelling in either direction and any leakage can be kept internal to the pump. The swash plate subassemblies are now tilted the same amount but in opposite directions in order to better balance the loading in the pump.

More specifically, FIG. 4 shows a variable displacement, axial pump 60 which comprises main shaft 61 defining the axis of rotation for the pump. Within the pump housing are two fixed outboard piston cylinder clusters 62, 63 at each end of shaft 61. In FIG. 4, three piston cylinders are visible in each cluster. Connected to the outboard head of each piston cylinder cluster 62 and 63 are fixed manifold and valve assemblies 64 and 65 respectively. (As shown in FIG. 4, the fixed manifold and valve assemblies are remote and are connected by hoses to the outboard heads of the piston cylinder clusters.) A pair of piston assemblies 66 and 67 are located at each end of shaft 61 at the inboard opening of each piston cylinder cluster 62 and 63 respectively. Each piston assembly comprises a set of pistons, piston rods connected to the pistons, and a mounting assembly for the piston rods. Two representative pistons 68 and their associated piston rods 69 are identified in dashed outline in FIG. 4. Piston assemblies 66, 67 are mounted such that the pistons are capable of reciprocating axial movement within its associated piston cylinder. As mentioned, here fixed manifold and valve assemblies 64, 65 and piston assemblies 66, 67 are double-acting and thus can pump water as the pistons reciprocate in either direction through hoses 72 (which are connected to the piston cylinders on both sides of the pistons). As before, the piston rod mounting assemblies are capable of pivoting with respect to shaft 61.

Pump 60 also comprises rotating swash plate pivot assembly 75 which includes a pair of pivoting swash plate subassemblies 70 and 71 at each end of shaft 61 inboard of each piston assembly 66, 67. Pivoting swash plate subassemblies 70 and 71 are connected to shaft 61 and are capable of pivoting with respect to the axis of shaft 61. Rotating swash plate pivot assembly 75 also comprises swash plate adjustment subassembly 76 which is connected to each pivoting swash plate subassembly 70, 71 and mounted so as to cause each swash plate subassembly 70, 71 to pivot according to the length of swash plate adjustment subassembly 76. As before, swash plate adjustment subassembly 76 comprises hydraulic ram cylinder 77 which connects to both pivoting swash plate subassemblies 70, 71. The length of swash plate adjustment subassembly 76 is varied by hydraulically varying the extension of hydraulic ram cylinder 77. Again as before, hydraulic ram cylinder 77 is double acting and thus can be extended or contracted via hydraulic control. A control system (again not shown) is employed to control the extension of the hydraulic ram cylinder and hence the length of swash plate adjustment subassembly 76.

To better balance loading in the embodiment of FIG. 4, swash plate subassemblies 70 and 71 are tilted in equal but opposite directions to one another. Gear segments 78 are mounted to each swash plate subassembly 70, 71 and thus synchronize the tilt between the two. Consequently, hydraulic ram cylinder 77 needs only to be connected to the swash plate assemblies and does not need to be fixed to an additional flange.

The following examples are provided to illustrate certain aspects of the disclosure but should not be construed as limiting in any way.

EXAMPLES

Estimated power generation capabilities were determined for a hydroelectric power system based on variable displacement, axial piston pumps of the disclosure and two possible waterwheel designs when used at Makaii Point in the Juskatla Narrows, on Graham Island of Haida Gwaii, British Columbia, Canada. In this exercise, models were created and evaluated to determine the output capacity of the waterwheels, the flow capacity of the pumping system, the surface flow velocities in the Juskatla Narrows, and the required pumped water reservoir size and firm power capacity at the hydroelectric power plant.

In summary, the mean stream flow in the Juskatla Narrows was determined to be about 1.6 m/s with speeds ranging from zero to 4 m/s. In a first example, the selected waterwheel design having a 5 m wheel diameter with 2 m wide blades was modeled to produce 3.8 kW in a stream flow of 1.6 m/s. When run through the full range of stream flows in the Juskatla Narrows, the system was estimated to produce a continuous, firm power output of 3.8 kW or more from the hydroelectric power system. In this example, it was assumed that an upper storage reservoir was elevated at about 250 m above sea level and that the hydro turbine was located at a point just above sea level.

Calculations of the output power capacity of the waterwheel were based mainly on those presented by Muller et al. in *Stream Wheels for Applications in Shallow and Deep Water*; Muller, Gerald, S. Denchfield, R. Marth, B. Shelmerdine; 32nd IAHR Conference 2007, Venice, Italy; 01-6 Jul. 2007. According to Muller et al., the present waterwheel would be in a deep water situation where the stream bed is substantially deeper than the submerged depth of the blades and the stream velocity is smaller than critical velocity. The waterwheel's power output is mainly a function of the blade surface area in the water, the stream velocity, and the blade velocity. The forces acting on the blade are a combination of hydrostatic head differences and momentum exchange from the water to the blade. The following equations were adapted from Muller et al. And here, it was assumed that only one full blade was in the water at any time. The force F on the blade was determined by:

$$F = \rho_w g \frac{b}{2}[(d+\Delta h_1)^2 - (d+\Delta h_2)^2] + \rho_w b(d+\Delta h_1)(v_1-v_2)^2$$

Force F is a combination of the hydrostatic head difference (first term on left hand side) and the momentum exchange (second term on left hand side) where $\rho_w$ is the water density, g is gravitational force, b is the width of the blades on the waterwheel. The blade or paddle depth into the water is given by d, and the water ramp-up height on the upstream portion of the blade is $\Delta h_1$ and the drop in water on the downstream is $\Delta h_2$. The free stream velocity is $v_1$ and the blade velocity is $v_2$.

The ramp-up water surface on the upstream side of the paddle is given by:

$$\Delta h_1 = \frac{v_1^2 - v_2^2}{2g}$$

According to Muller the ratio of head difference was determined experimentally and is:

$$\Delta h_2 \approx \frac{2}{3}\Delta h_1 \text{ (from tests)}$$

The power output P is a function of force and paddle velocity and is given by:

$$P = Fv_2$$

From here the torque T from the waterwheel is calculated as:

$$T = F \times r$$

Using the equations above a power output curve can be drawn based on the blade velocity $v_2$ at a fixed flow velocity $v_1$. This power curve was evaluated experimentally in Muller et al. with a small (0.5 m diameter) waterwheel and compared to calculations using the above equations. The calculated power output results were about 85% (at maximum power out) of those in the experiment of Muller et al. The difference may be because of the assumption here that only one full blade was in the water at any time whereas in the Muller et al. experiment, multiple blades may have been in the water, which would increase the available power.

The waterwheel considered in this first example was 5 m in diameter with a set of rectangular blades that were 2 m wide and equally spaced around the circumference of the waterwheel. FIG. 3*d* shows a portion of this waterwheel design with one of the blades visible. The dip depth of the blade was set to 0.875 m which was based on a ratio of blade depth to wheel diameter of 0.175 used in Muller. The recommended range for the depth is 0.12 to 0.2 of the waterwheel diameter. The number of paddles or blades was such that at least one full blade must be in the water at any given time. This meant that when one blade was fully extended into the stream, the next blade was at least touching the water surface. With the dimensions selected, calculations indicate an angle of 49.5° between blades and hence a minimum number of (7.3 rounded up to) 8 blades for the prototype model. (Note: the number of blades could be increased and would thus be expected to increase the power output of the system.)

Using the preceding equations, a theoretical output power curve was calculated as a function of blade velocity for this specific waterwheel for a given fixed stream velocity of 1.6 m/s. (This was the mean stream flow rate in Juskatla as discussed below.) Power output was corrected by a factor of 1.15 to account for the increased number of blades in the waterwheel. From these calculations, a maximum power output of about 3.8 kW is obtained when the blade speed is 0.7 to 0.8 m/s or at a ratio of about 0.44 to 0.5 times that of the stream velocity. In the Muller et al. experiment, that ratio was about 0.44. Thus, this specific waterwheel would be expected to produce 3.8 kW in a stream flow of 1.6 m/s, but the calculations suggest it can produce 15 kW at 2.5 m/s. The output from an exemplary axial piston pump and finally from the hydroelectric power system overall were then modeled assuming this waterwheel power output was available.

The pump model was designed to simulate loading of the waterwheel under different stream speeds. As stream speed increases, causing increased power transmission via the water wheel, pump loading on the wheel is increased by increasing the swash plate angle. Output pressure is maintained, with the increase in power being used to increase pump flow. The model expressed changes in flow and head with respect to swash plate angle and available torque.

The torque output of the waterwheel under varying stream speeds is converted to force acting through the swash by:

Torque(Nm)=Force(N)×Swash plate radius(m)

As there are two swash plates driven by the shaft, total force is divided by two to yield swash plate force per piston block. Swash plate radius is a function of the maximum allowable swash plate angle and the swept stroke of the cylinder. For purposes of this first example, a conventional maximum swash plate angle of 18 degrees was assumed.

Swash plate diameter then is given by:

Swash plate diameter(m)=Cylinder swept stroke(m)÷sin 18°.

The rotating force acting through the swash plate was resolved into a reciprocating force using vectors. The swash plate was treated as an inclined plane. It was further assumed that there were no significant friction losses in the swash plate bearings.

To further simplify the analysis, it was assumed that there would be a net positive suction head for all the cylinders on the intake stroke. In other words, it was assumed that no energy would be expended drawing water into the cylinders due to a positive head on the intake side (i.e. that the tail-race reservoir was elevated above the pump.) It was further assumed that at any given time in the cycle of a revolution, that half the cylinders would be on the intake cycle and the other half would be on the output cycle. Therefore, at any given time, half the number of cylinders will be utilizing the available pumping force. To account for the various dynamic hydraulic friction losses associated with one-way valves, restricted exit losses, and pipe friction losses, it was assumed here that a very conservative estimate for these dynamic friction losses would be a doubling of the maximum static head involved (i.e. here the maximum static head was taken to be 250 m, and thus dynamic friction losses would be equivalent to about 500 m).

For this model, an axial pump similar to that shown in FIGS. 3a-3f was assumed. The number of pump cylinders, the cylinder dimensions, and the swash plate angle had been configured to optimize pump output at an average stream speed of 1.6 m/s. Specifically, these parameters were # pump cylinders=10 (at each end), swept cylinder stroke=30 cm, cylinder bore diameter=12 cm, with calculated swash diameter=97 cm, piston CSA=0.011 $m^2$, and swept volume=0.0034 $m^3$. Then, assuming the volumetric efficiency was a relatively low 80%, the pressures generated in each cylinder on the output cycle, available pumping head, flow per revolution, and output volume per unit time could then be calculated as is known to those skilled in the art.

From this model, it was found that torque reaches a maximum of 45 kNm when the swash plate angle reaches it maximum of 18 degrees, which occurs at stream velocities above 3 m/s. Up to 3 m/s, the maximum available power from the hydropower pump is fully used. Above this limit, the waterwheel will spin at a higher rpm, pumping pump-water at a higher rate, but the pump is not using the maximum available power from the waterwheel. (Again, providing for greater possible swash plate angles raises this limit and thus allows for an increase in efficiency at these greater stream velocities.)

From the different stream velocities, power was then calculated using:

Power(W)=head(m)×flow(kg/s)×gravity(m/$s^2$)×turbine efficiency (%)

The pressure head, however, varies depending on the stream velocity of the tidal flow. Using the present model, the pressure head varies at the turbine temporarily during periods of tidal slack. When the pump is operating, the pressure will rise to 500 m head at the turbine nozzle (taking into account dynamic friction losses as mentioned above). Some of the pumped water will go up to the upper reservoir and some will feed directly into the hydro plant. When the hydro plant is being fed only by the upper reservoir the water pressure will be lower, dropping to 250 m of head. For simplicity here, it was assumed that 50% of the water volume will feed the turbine directly and 50% will flow back from the upper reservoir, and that the average pressure that the nozzle experiences is midway between these extremes, i.e., 375 m total head. This was used to calculate power. A typical plant efficiency of 0.8 for the hydro turbine was also assumed since a significant portion of the pumped water goes directly into the hydro plant. With an output power from the waterwheel of approximately 3.8 kW at 1.6 m/s stream velocity, the flow available for the hydroelectric power plant is 0.62 l/s. So, using the preceding equation, power was calculated as:

Power=375 m×0.62 liter(kg)/s×9.8 m/s2×0.8=1.8 kW

Therefore, the expected generated electrical power from the hydroelectric power system is 1.8 kW. This represents a hydroplant efficiency of about 48% (1.8/3.8 kW) at this stream velocity. A detailed table of parameters and values for the preceding models is provided in Table 1 below.

TABLE 1

Theoretical system performance data versus water speed for 1st example

| Stream velocity v1 | Paddle velocity v2 | Ratio v2/v1 | RPM | dh1 | dh2 | Useful power kW | Paddle force kN | Torque kNm |
|---|---|---|---|---|---|---|---|---|
| 0 | 0.00 | | 0.0 | 0.000 | 0.000 | 0.00 | 0.00 | 0.00 |
| 0.1 | 0.04 | 0.44 | 0.2 | 0.000 | 0.000 | 0.00 | 0.02 | 0.04 |
| 0.2 | 0.09 | 0.44 | 0.3 | 0.002 | 0.001 | 0.01 | 0.08 | 0.16 |
| 0.3 | 0.13 | 0.44 | 0.5 | 0.004 | 0.002 | 0.02 | 0.18 | 0.37 |
| 0.4 | 0.18 | 0.44 | 0.7 | 0.007 | 0.004 | 0.06 | 0.32 | 0.66 |
| 0.5 | 0.22 | 0.44 | 0.8 | 0.010 | 0.007 | 0.11 | 0.50 | 1.03 |
| 0.6 | 0.26 | 0.44 | 1.0 | 0.015 | 0.010 | 0.19 | 0.72 | 1.48 |
| 0.7 | 0.31 | 0.44 | 1.2 | 0.020 | 0.013 | 0.30 | 0.98 | 2.02 |
| 0.8 | 0.35 | 0.44 | 1.3 | 0.026 | 0.018 | 0.45 | 1.29 | 2.65 |
| 0.9 | 0.40 | 0.44 | 1.5 | 0.033 | 0.022 | 0.65 | 1.63 | 3.37 |
| 1 | 0.44 | 0.44 | 1.7 | 0.041 | 0.027 | 0.89 | 2.02 | 4.17 |
| 1.1 | 0.48 | 0.44 | 1.8 | 0.050 | 0.033 | 1.19 | 2.46 | 5.07 |
| 1.2 | 0.53 | 0.44 | 2.0 | 0.059 | 0.039 | 1.55 | 2.94 | 6.06 |
| 1.3 | 0.57 | 0.44 | 2.2 | 0.070 | 0.046 | 1.98 | 3.47 | 7.15 |
| 1.4 | 0.62 | 0.44 | 2.4 | 0.081 | 0.054 | 2.49 | 4.04 | 8.34 |
| 1.5 | 0.66 | 0.44 | 2.5 | 0.093 | 0.062 | 3.08 | 4.67 | 9.63 |
| 1.6 | 0.70 | 0.44 | 2.7 | 0.105 | 0.070 | 3.76 | 5.34 | 11.02 |
| 1.7 | 0.75 | 0.44 | 2.9 | 0.119 | 0.079 | 4.54 | 6.07 | 12.52 |
| 1.8 | 0.79 | 0.44 | 3.0 | 0.133 | 0.089 | 5.42 | 6.85 | 14.13 |
| 1.9 | 0.84 | 0.44 | 3.2 | 0.149 | 0.099 | 6.42 | 7.69 | 15.85 |
| 2 | 0.88 | 0.44 | 3.4 | 0.165 | 0.110 | 7.55 | 8.58 | 17.69 |
| 2.1 | 0.92 | 0.44 | 3.5 | 0.181 | 0.121 | 8.81 | 9.53 | 19.66 |
| 2.2 | 0.97 | 0.44 | 3.7 | 0.199 | 0.133 | 1021 | 10.54 | 21.75 |
| 2.3 | 1.01 | 0.44 | 3.9 | 0.218 | 0.145 | 11.76 | 11.62 | 23.97 |
| 2.4 | 1.06 | 0.44 | 4.0 | 0.237 | 0.158 | 13.48 | 12.76 | 26.32 |
| 2.5 | 1.10 | 0.44 | 4.2 | 0.257 | 0.171 | 15.37 | 13.97 | 28.81 |
| 2.6 | 1.14 | 0.44 | 4.4 | 0.278 | 0.185 | 17A4 | 15.25 | 31.45 |
| 2.7 | 1.19 | 0.44 | 4.5 | 0.300 | 0.200 | 19.72 | 16.60 | 34.24 |
| 2.8 | 1.23 | 0.44 | 4.7 | 0.323 | 0.215 | 22.21 | 18.03 | 37.18 |
| 2.9 | 1.28 | 0.44 | 4.9 | 0.346 | 0.231 | 24.92 | 19.53 | 40.28 |

TABLE 1-continued

Theoretical system performance data versus water speed for 1st example

| | | | | | | | | |
|---|---|---|---|---|---|---|---|---|
| 3 | 1.32 | 0.44 | 5.0 | 0.370 | 0.247 | 27.87 | 21.11 | 43.55 |
| 3.1 | 1.43 | 0.46 | 5.5 | 0.386 | 0.257 | 31.04 | 21.70 | 44.75 |
| 3.2 | 1.58 | 0.49 | 6.0 | 0.396 | 0.264 | 34.19 | 21.70 | 44.75 |
| 3.3 | 1.72 | 0.52 | 6.6 | 0.405 | 0.270 | 37.29 | 21.70 | 44.75 |
| 3.4 | 1.86 | 0.55 | 7.1 | 0.413 | 0.276 | 40.34 | 21.70 | 44.75 |
| 3.5 | 2.00 | 0.57 | 7.6 | 0.421 | 0.281 | 43.34 | 21.70 | 44.75 |
| 3.6 | 2.13 | 0.59 | 8.2 | 0.429 | 0.286 | 46.30 | 21.70 | 44.75 |
| 3.7 | 2.27 | 0.61 | 8.7 | 0.436 | 0.291 | 49.22 | 21.70 | 44.75 |
| 3.8 | 2.40 | 0.63 | 9.2 | 0.443 | 0.295 | 52.11 | 21.70 | 44.75 |
| 3.9 | 2.53 | 0.65 | 9.7 | 0.449 | 0.299 | 54.96 | 21.70 | 44.75 |
| 4 | 2.66 | 0.67 | 10.2 | 0.455 | 0.303 | 57.79 | 21.70 | 44.75 |

| Tang. force/ swash plate KN | Swash plate angle degrees | Swept volume/ cylinder m^3 | Force needed/ swash kN | Maximum flow m^3/sec | Maximum flow cu. ft/sec | Hydro-power out kW | Efficiency |
|---|---|---|---|---|---|---|---|
| 0.0 | 0 | 0 | 0.0 | 0.00000 | 0.0000 | | |
| 0.0 | 0.02 | 3.81E−06 | 0.0 | 0.00000 | 0.0000 | 0.00 | 0.58 |
| 0.2 | 0.08 | 1.52E−05 | 0.2 | 0.00000 | 0.0000 | 0.00 | 0.58 |
| 0.4 | 0.16 | 3.057E−05 | 0.4 | 0.00000 | 0.0001 | 0.01 | 0.51 |
| 0.7 | 0.28 | 5.33E−05 | 0.7 | 0.00001 | 0.0003 | 0.03 | 0.50 |
| 1.1 | 0.44 | 8.38E−05 | 1.1 | 0.00002 | 0.0007 | 0.06 | 0.50 |
| 1.5 | 0.60 | 0.000114 | 1.5 | 0.00003 | 0.0011 | 0.09 | 0.48 |
| 2.1 | 0.83 | 0.000160 | 2.1 | 0.00005 | 0.0018 | 0.15 | 0.49 |
| 2.7 | 1.07 | 0.000206 | 2.7 | 0.00007 | 0.0026 | 0.22 | 0.48 |
| 3.5 | 1.39 | 0.000267 | 3.5 | 0.00011 | 0.0038 | 0.32 | 0.49 |
| 4.3 | 1.71 | 0.000327 | 4.3 | 0.00015 | 0.0052 | 0.43 | 0.49 |
| 5.2 | 2.07 | 0.000396 | 5.2 | 0.00020 | 0.0069 | 0.57 | 0.48 |
| 6.2 | 2.46 | 0.000472 | 6.2 | 0.00025 | 0.0090 | 0.75 | 0.48 |
| 7.4 | 2.94 | 0.000563 | 7.4 | 0.00033 | 0.0116 | 0.97 | 0.49 |
| 8.6 | 3.42 | 0.000654 | 8.6 | 0.00041 | 0.0145 | 1.21 | 0.49 |
| 9.9 | 3.93 | 0.000753 | 9.9 | 0.00051 | 0.0179 | 1.49 | 0.48 |
| 11.3 | 4.49 | 0.000859 | 11.3 | 0.00062 | 0.0217 | 1.81 | 0.48 |
| 12.9 | 5.12 | 0.000980 | 12.9 | 0.00075 | 0.0264 | 2.20 | 0.48 |
| 14.6 | 5.79 | 0.001108 | 14.6 | 0.00089 | 0.0316 | 2.63 | 0.48 |
| 16.3 | 6.46 | 0.001236 | 16.3 | 0.00105 | 0.0372 | 3.10 | 0.48 |
| 18.2 | 7.21 | 0.001379 | 18.2 | 0.00124 | 0.0436 | 3.64 | 0.48 |
| 20.2 | 8.00 | 0.001528 | 20.2 | 0.00144 | 0.0508 | 4.23 | 0.48 |
| 22.4 | 8.86 | 0.00169 | 22.4 | 0.00167 | 0.0589 | 4.91 | 0.48 |
| 24.7 | 9.76 | 0.001862 | 24.7 | 0.00192 | 0.0678 | 5.65 | 0.48 |
| 27.1 | 10.70 | 0.002039 | 27.1 | 0.00219 | 0.0774 | 6.45 | 0.48 |
| 29.7 | 11.71 | 0.002229 | 29.7 | 0.00250 | 0.0882 | 7.35 | 0.48 |
| 32.4 | 12.76 | 0.002425 | 32.4 | 0.00283 | 0.0998 | 8.32 | 0.48 |
| 35.3 | 13.88 | 0.002633 | 35.3 | 0.00319 | 0.1125 | 9.38 | 0.48 |
| 38.3 | 15.03 | 0.00285 | 38.3 | 0.00357 | 0.1261 | 10.51 | 0.47 |
| 41.5 | 16.25 | 0.003072 | 41.5 | 0.00399 | 0.1410 | 11.75 | 0.47 |
| 44.9 | 17.53 | 0.003308 | 44.9 | 0.00445 | 0.1570 | 13.09 | 0.47 |
| 46.1 | 18.00 | 0.00339 | 46.1 | 0.00494 | 0.1746 | 14.55 | 0.47 |
| 46.1 | 18.00 | 0.00339 | 46.1 | 0.00545 | 0.1923 | 16.03 | 0.47 |
| 46.1 | 18.00 | 0.00339 | 46.1 | 0.00594 | 0.2097 | 17.48 | 0.47 |
| 46.1 | 18.00 | 0.00339 | 46.1 | 0.00642 | 0.2269 | 18.91 | 0.47 |
| 46.1 | 18.00 | 0.00339 | 46.1 | 0.00690 | 0.2437 | 20.31 | 0.47 |
| 46.1 | 18.00 | 0.00339 | 46.1 | 0.00737 | 0.2604 | 21.70 | 0.47 |
| 46.1 | 18.00 | 0.00339 | 46.1 | 0.00784 | 0.2768 | 23.07 | 0.47 |
| 46.1 | 18.00 | 0.00339 | 46.1 | 0.00830 | 0.2930 | 24.42 | 0.47 |
| 46.1 | 18.00 | 0.00339 | 46.1 | 0.00875 | 0.3091 | 25.76 | 0.47 |
| 46.1 | | 0.00339 | 46.1 | 0.00920 | 0.3250 | 27.09 | 0.47 |

The mean power output of the model over the full range of stream flow velocities however should vary significantly from the above calculations. Stream velocities and mean power output from the hydroelectric power system were thus estimated as follows.

The flow rate of water going in and out of the Juskatla Inlet was determined based on hourly tide data (provided by the Canadian Hydrographic Service at Fisheries and Oceans Canada). Mass conservation was assumed and flow coming in from the surrounding watershed was assumed to be insignificant compared to the tidal flow. The vertical velocity of the Juskatla inlet water surface was calculated by taking the difference in tide height between each hour and dividing by the interval time. The area of the inlet was estimated at about 35 km². The cross-sectional area of the Juskatla Narrows was given as 720 m² (as per Hart, Stephen, 2008, Haida Gwaii/Queen Charlotte Islands Demonstration Tidal Power Plant Feasibility Study. A Hatch Energy report for British Columbia Ministry of Energy, Mines and Petroleum Resources). The area-averaged flow velocity in the Narrows was calculated and adjusted using a constant of 0.83 (determined by matching the calculated flow to that measured in practice as at Jun. 9, 2011).

From the determined frequency distribution of flow velocities, the most frequently occurring water surface velocity was 1.3 m/s and the average stream flow velocity was 1.6 m/s. The estimated flow velocity ranged from 0 to 4 m/s.

Using the preceding output calculations, these tidal velocities were then converted into pumped flow rate. The hourly pumped volumes of pumpwater were summed up into daily volume flows. The average flow was found to be 0.0013 m³/s and the daily averaged pumped volume was 111 m³ to the upper reservoir at 250 m static head. This is the average pumped flow over the whole range of stream velocities (as opposed to the pumped flow of 0.62 l/s at 1.6 m/s). The pressure head, however, varies according to the phase of tidal flow. When the pump is operating the pressure will rise to 500 m head at the hydro turbine nozzle. As mentioned, the pressure head varies at the turbine temporarily during periods of tidal slack. When the turbine is being operated by the reservoir only, the water pressure drops to 250 m. It was assumed that the average pressure that the nozzle experiences is midway between these extremes or 375 m total head. A typical plant efficiency of 0.8 for the hydro turbine was assumed.

This time then:

$$\text{Power} = 375 \text{ m} \times 1.3 \text{ liter(kg)/s} \times 9.81 \text{ m/s}^2 \times 0.8$$

And therefore potential electrical power available for generation at the hydro site will be 3.8 kW using the above hydropower pump.

Finally, an estimate for the required reservoir size was made. In the preceding, the pumped flow ranged from 44 m³ to 220 m³ per day for the example pump in an average stream flow of 1.6 m/s. The upper reservoir was taken to start at about 800 m³ of water. It was determined that a reservoir holding 1100 m³ of water would be required to accommodate the system needs over the course of a year (just becoming completely empty in October and reaching its maximum in January). No consideration was given to water evaporation or rain accumulation in this estimate.

The preceding model was based on very conservative assumptions for friction losses and pump capability. In a second example, an axial pump with greater maximum swash plate angle and double-acting cylinder design similar to that shown in FIG. 4 was assumed. In addition, a more realistic, lower expectation for friction losses was assumed. And finally as listed below, certain other changes in waterwheel design and cylinder parameters were assumed.

Here, the waterwheel design considered was the same as in the previous example except that the dip depth of the blade was set to 0.800 m which was based on a ratio of blade depth to wheel diameter of 0.2. Also, an angle of 53.1° between blades and hence a minimum number of 7 blades (6.8 rounded up) was assumed.

This time, a maximum swash plate angle of 30 degrees was assumed. And further, 8 double-acting piston cylinders were assumed (i.e. 4 at each end) with the following characteristics: swept cylinder stroke=37.5 cm, cylinder bore diameter=20.3 cm, calculated piston CSA=0.032 m², and swept volume=0.0122 m³.

And finally, more likely realistic friction losses were assumed such that a required head of only 286 m was assumed to obtain the same gross head of 250 m.

A detailed table of parameters and values for this second example is provided in Table 2 below.

TABLE 2

Theoretical system performance data versus water speed for 2nd example

| Stream velocity v1 | Paddle velocity v2 | Ratio v2/v1 | RPM | dh1 | dh2 | Useful power kW | Paddle force kN | Torque kNm |
|---|---|---|---|---|---|---|---|---|
| 0 | 0.00 | | 0.0 | 0.000 | 0.000 | 0.00 | 0.00 | 0.00 |
| 0.1 | 0.04 | 0.44 | 0.2 | 0.000 | 0.000 | 0.00 | 0.02 | 0.05 |
| 0.2 | 0.09 | 0.44 | 0.3 | 0.002 | 0.001 | 0.01 | 0.09 | 0.18 |
| 0.3 | 0.13 | 0.44 | 0.5 | 0.004 | 0.002 | 0.03 | 0.20 | 0.41 |
| 0.4 | 0.18 | 0.44 | 0.7 | 0.007 | 0.004 | 0.06 | 0.36 | 0.73 |
| 0.5 | 0.22 | 0.44 | 0.8 | 0.010 | 0.007 | 0.13 | 0.57 | 1.14 |
| 0.6 | 0.26 | 0.44 | 1.0 | 0.015 | 0.010 | 0.22 | 0.82 | 1.64 |
| 0.7 | 0.31 | 0.44 | 1.2 | 0.020 | 0.013 | 0.35 | 1.12 | 2.24 |
| 0.8 | 0.35 | 0.44 | 1.3 | 0.026 | 0.018 | 0.52 | 1.47 | 2.93 |
| 0.9 | 0.40 | 0.44 | 1.5 | 0.033 | 0.022 | 0.74 | 1.86 | 3.73 |
| 1 | 0.44 | 0.44 | 1.7 | 0.041 | 0.027 | 1.02 | 2.31 | 4.61 |
| 1.1 | 0.48 | 0.44 | 1.8 | 0.050 | 0.033 | 1.36 | 2.80 | 5.60 |
| L2 | 0.53 | 0.44 | 2.0 | 0.059 | 0.039 | 1.77 | 3.35 | 6.70 |
| 1.3 | 0.57 | 0.44 | 2.2 | 0.070 | 0.046 | 2.26 | 3.95 | 7.89 |
| 1.4 | 0.62 | 0.44 | 2.4 | 0.081 | 0.054 | 2.83 | 4.60 | 9.20 |
| 1.5 | 0.66 | 0.44 | 2.5 | 0.093 | 0.062 | 3.50 | 5.30 | 10.61 |
| 1.6 | 0.70 | 0.44 | 2.7 | 0.105 | 0.070 | 4.27 | 6.07 | 12.13 |
| 1.7 | 0.75 | 0.44 | 2.9 | 0.119 | 0.079 | 5.15 | 6.89 | 13.78 |
| 1.8 | 0.79 | 0.44 | 3.0 | 0.133 | 0.089 | 6.15 | 7.77 | 15.53 |
| 1.9 | 0.84 | 0.44 | 3.2 | 0.149 | 0.099 | 7.28 | 8.71 | 17.42 |
| 2 | 0.88 | 0.44 | 3.4 | 0.165 | 0.110 | 8.55 | 9.71 | 19.42 |
| 2.1 | 0.92 | 0.44 | 3.5 | 0.181 | 0.121 | 9.96 | 10.78 | 21.56 |
| 2.2 | 0.97 | 0.44 | 3.7 | 0.199 | 0.133 | 11.53 | 11.92 | 23.83 |
| 2.3 | 1.01 | 0.44 | 3.9 | 0.218 | 0.145 | 13.28 | 13.12 | 26.24 |
| 2.4 | 1.06 | 0.44 | 4.0 | 0.237 | 0.158 | 15.20 | 14.39 | 28.79 |
| 2.5 | 1.10 | 0.44 | 4.2 | 0.257 | 0.171 | 17.32 | 15.74 | 31.48 |
| 2.6 | 1.14 | 0.44 | 4.4 | 0.278 | 0.185 | 19.64 | 17.16 | 34.33 |
| 2.7 | 1.19 | 0.44 | 4.5 | 0.300 | 0.200 | 22.18 | 18.67 | 37.33 |
| 2.8 | 1.23 | 0.44 | 4.7 | 0.323 | 0.215 | 24.95 | 20.25 | 40.50 |
| 2.9 | 1.28 | 0.44 | 4.9 | 0.346 | 0.231 | 27.96 | 21.91 | 43.83 |
| 3 | 1.32 | 0.44 | 5.0 | 0.370 | 0.247 | 31.24 | 23.66 | 47.33 |
| 3.1 | 1.36 | 0.44 | 5.2 | 0.395 | 0.264 | 34.788 | 25.50 | 51.01 |
| 3.2 | 1.41 | 0.44 | 5.4 | 0.421 | 0.281 | 38.63 | 27.44 | 54.87 |
| 3.3 | 1.45 | 0.44 | 5.5 | 0.448 | 0.299 | 42.78 | 29.46 | 58.92 |
| 3.4 | 1.50 | 0.44 | 5.7 | 0.476 | 0.317 | 47.25 | 31.59 | 63.17 |
| 3.5 | 1.54 | 0.44 | 5.9 | 0.504 | 0.336 | 52.07 | 33.81 | 67.63 |

TABLE 2-continued

Theoretical system performance data versus water speed for 2nd example

| 3.6 | 1.58 | 0.44 | 6.1 | 0.533 | 0.355 | 57.25 | 36.14 | 72.29 |
|---|---|---|---|---|---|---|---|---|
| 3.7 | 1.63 | 0.44 | 6.2 | 0.563 | 0.375 | 62.81 | 38.58 | 77.16 |
| 3.8 | 1.67 | 0.44 | 6.4 | 0.594 | 0.396 | 68.77 | 41.13 | 82.26 |
| 3.9 | 1.72 | 0.44 | 6.6 | 0.626 | 0.417 | 75.15 | 43.80 | 87.59 |
| 4 | 1.76 | 0.44 | 6.7 | 0.658 | 0.439 | 81.98 | 46.58 | 93.16 |

| Tang. force/ swash plate KN | Swash plate angle degrees | Force needed/ swash kN | Swept volume/ cylinder m^3 | Maximum flow m^3/sec | Maximum flow cu. ft/sec | Hydro-power out kW | Efficiency |
|---|---|---|---|---|---|---|---|
| 0.0 | 0.00 | 0.0 | 0.00000 | 0.00000 | 0.0000 | | |
| 0.0 | 0.01 | 0.0 | 0.00001 | 0.00000 | 0.0000 | 0.00 | 0.57 |
| 0.2 | 0.06 | 0.2 | 0.00003 | 0.00000 | 0.0001 | 0.00 | 0.57 |
| 0.4 | 0.13 | 0.4 | 0.00007 | 0.00001 | 0.0003 | 0.02 | 0.57 |
| 0.7 | 0.24 | 0.7 | 0.00013 | 0.00002 | 0.0007 | 0.04 | 0.57 |
| 1.2 | 0.37 | 1.2 | 0.00020 | 0.00004 | 0.0013 | 0.07 | 0.57 |
| 1.7 | 0.53 | 1.7 | 0.00029 | 0.00006 | 0.0022 | 0.12 | 0.57 |
| 2.3 | 0.73 | 2.3 | 0.00040 | 0.00010 | 0.0035 | 0.20 | 0.57 |
| 3.0 | 0.95 | 3.0 | 0.00052 | 0.00015 | 0.0053 | 0.29 | 0.57 |
| 3.8 | 1.21 | 3.8 | 0.00066 | 0.00021 | 0.0076 | 0.42 | 0.57 |
| 4.8 | 1.50 | 4.8 | 0.00082 | 0.00029 | 0.0104 | 0.58 | 0.57 |
| 5.8 | 1.82 | 5.8 | 0.00100 | 0.00039 | 0.0139 | 0.77 | 0.57 |
| 6.9 | 2.17 | 6.9 | 0.00119 | 0.00051 | 0.0181 | 1.01 | 0.57 |
| 8.1 | 2.56 | 8.1 | 0.00141 | 0.00066 | 0.0231 | 1.29 | 0.57 |
| 9.5 | 2.98 | 9.5 | 0.00164 | 0.00082 | 0.0290 | 1.61 | 0.57 |
| 10.9 | 3.44 | 10.9 | 0.00189 | 0.00102 | 0.0359 | 1.99 | 0.57 |
| 12.5 | 3.93 | 12.5 | 0.00216 | 0.00124 | 0.0437 | 2.43 | 0.57 |
| 14.2 | 4.46 | 14.2 | 0.00245 | 0.00149 | 0.0527 | 2.93 | 0.57 |
| 16.0 | 5.03 | 16.0 | 0.00276 | 0.00178 | 0.0629 | 3.49 | 0.57 |
| 17.9 | 5.63 | 17.9 | 0.00309 | 0.00211 | 0.0743 | 4.13 | 0.57 |
| 20.0 | 6.28 | 20.0 | 0.00344 | 0.00247 | 0.0872 | 4.84 | 0.57 |
| 22.2 | 6.96 | 22.2 | 0.00382 | 0.00287 | 0.1015 | 5.64 | 0.57 |
| 24.5 | 7.69 | 24.5 | 0.00421 | 0.00332 | 0.1173 | 6.52 | 0.57 |
| 27.0 | 8.45 | 27.0 | 0.00463 | 0.00382 | 0.1348 | 7.49 | 0.56 |
| 29.6 | 9.26 | 29.6 | 0.00507 | 0.00436 | 0.1539 | 8.55 | 0.56 |
| 32.4 | 10.11 | 32.4 | 0.00553 | 0.00495 | 0.1749 | 9.72 | 0.56 |
| 35.4 | 11.00 | 35.4 | 0.00601 | 0.00560 | 0.1978 | 10.99 | 0.56 |
| 38.4 | 11.94 | 38.4 | 0.00651 | 0.00631 | 0.2226 | 12.37 | 0.56 |
| 41.7 | 12.92 | 41.7 | 0.00704 | 0.00707 | 0.2495 | 13.86 | 0.56 |
| 45.1 | 13.94 | 45.1 | 0.00758 | 0.00789 | 0.2785 | 15.47 | 0.55 |
| 48.7 | 15.00 | 48.7 | 0.00815 | 0.00877 | 0.3096 | 17.20 | 0.55 |
| 52.5 | 16.11 | 52.5 | 0.00874 | 0.00971 | 0.3430 | 19.06 | 0.55 |
| 56.5 | 17.26 | 56.5 | 0.00934 | 0.01072 | 0.3786 | 21.03 | 0.54 |
| 60.7 | 18.45 | 60.7 | 0.00997 | 0.01179 | 0.4164 | 23.14 | 0.54 |
| 65.1 | 19.68 | 65.1 | 0.01061 | 0.01293 | 0.4566 | 25.37 | 0.54 |
| 69.6 | 20.96 | 69.6 | 0.01126 | 0.01413 | 0.4990 | 27.73 | 0.53 |
| 74.4 | 22.26 | 74.4 | 0.01193 | 0.01540 | 0.5437 | 30.21 | 0.53 |
| 79.5 | 23.60 | 79.5 | 0.01261 | 0.01673 | 0.5906 | 32.82 | 0.52 |
| 84.7 | 24.98 | 84.7 | 0.01330 | 0.01812 | 0.6397 | 35.55 | 0.52 |
| 90.2 | 26.38 | 90.2 | 0.01399 | 0.01957 | 0.6909 | 38.39 | 0.51 |
| 95.9 | 27.81 | 95.9 | 0.01469 | 0.02107 | 0.7441 | 41.34 | 0.50 |

The calculated power out is markedly greater for this second example and illustrates the potential for improvement given appropriate waterwheel and pump designs and if friction losses are kept reasonably low.

All of the above mentioned U.S. patents and applications, foreign patents and applications and non-patent publications referred to in this specification, are incorporated herein by reference in their entirety.

While particular embodiments, aspects, and applications of the present disclosure have been shown and described, it is understood by those skilled in the art, that the disclosure is not limited thereto. For instance, the detailed description discussed a hydroelectric system comprising a single hydropower pump mounted on a floating barge. Depending on needs and site limitations, multiple hydropower pumps may be employed in a system. Further, it may be unnecessary in practice to maintain the hydropower pump at a constant height with respect to the moving stream and thus a floating mount may be unnecessary. Further still, while an axial piston pump like that described above offers certain advantages, it is possible to use other variable displacement piston pumps. For instance, a configuration using a vertical axis waterwheel or turbine and a variable displacement, radial piston pump may be considered. In such an embodiment, an advantage is that more diameter is available above the waterline. And further still, with regards to the aforementioned variable displacement, axial piston pump, the swash plate adjustment subassembly may be pneumatically operated instead of hydraulically operated and may be adjusted by means of a gear drive, machine screw or other suitable mechanisms. It may also prove useful to consider employing remote manifold and valve assemblies connected to outboard heads of the fixed outboard piston cylinder clusters.

Thus, many other modifications or alterations may be made by those skilled in the art without departing from the spirit and scope of the present disclosure. The disclosure should therefore be construed in accordance with the following claims.

What is claimed is:

1. A hydropower pump comprising:
a variable displacement piston pump comprising a rotating shaft, a fixed piston cylinder cluster, a fixed manifold and valve assembly, a piston assembly, a rotating swash plate pivot assembly, and a control assembly for adjusting the angle of the swash plates in the swash plate pivot assembly; and
a waterwheel blade directly connected to the rotating shaft.

2. A hydroelectric power system for generating tidal power comprising:
the hydropower pump of claim 1;
a pier comprising the hydropower pump wherein the pier is anchored to a seabed location to orient the waterwheel blade with respect to the tide;
an upper reservoir for accumulating pumpwater pumped by the hydropower pump;
a hydro turbine for generating electrical power;
a penstock for piping pumpwater from the hydropower pump to the upper reservoir and for piping pumpwater from the hydropower pump and from the upper reservoir through the hydro turbine;
a piping network for providing pumpwater from an outlet of the hydropower pump to the penstock; and
a controller for controlling the control assembly in the hydropower pump.

3. The hydroelectric power system of claim 2 comprising:
a lower reservoir for accumulating pumpwater passing through the hydro turbine;
the penstock is additionally for piping pumpwater from the hydropower pump and from the upper reservoir through the hydro turbine and to the lower reservoir; and
the piping network is additionally for returning pumpwater from the lower reservoir to an inlet of the hydropower pump.

4. A method for generating hydroelectric power comprising:
identifying a source of flowing water wherein the a water speed of the flowing water varies over a range greater than about 1 m/s in breadth;
providing a hydropower pump including a variable displacement piston pump having a rotating shaft, a fixed piston cylinder cluster, a fixed manifold and valve assembly, a piston assembly, a rotating swash plate pivot assembly, and a control assembly for adjusting an angle of swash plates in the swash plate pivot assembly, the hydropower pump also including a waterwheel blade directly connected to the rotating shaft of the variable displacement piston pump;
providing a supply of pumpwater;
positioning the waterwheel blade in the flowing water such that the rotating shaft rotates with the flowing water and pumps pumpwater from the supply;
controlling the angle of the swash plates in the pump such that the angle is decreased and increased in accordance with a respective decrease and increase in water speed of the flowing water while maintaining an essentially constant output pressure of pumpwater from the pump over most of the water speed range; and
storing the pumped pumpwater in an upper reservoir positioned above the hydropower pump.

5. The method of claim 4 wherein the pump shaft rotates at speeds in the range from 0 to about 10 rpm.

6. The method of claim 4 wherein the water speed varies over a range up to about 5 m/s in breadth.

7. The method of claim 4 wherein the mean speed of the flowing water is greater than or equal to 1.6 m/s.

8. The method of claim 4 wherein the source of flowing water is tidal.

9. A hydropower pump comprising:
a variable displacement piston pump selected from the group consisting of a variable displacement axial piston pump and a variable displacement radial piston pump, the variable displacement piston pump comprising a rotating shaft, a fixed piston cylinder cluster, a fixed manifold and valve assembly, a piston assembly, a rotating assembly adjusting displacement, and a control assembly controlling the rotating assembly; and
a waterwheel blade directly connected to the rotating shaft.

* * * * *